United States Patent
Stokkeland et al.

(10) Patent No.: US 8,351,294 B2
(45) Date of Patent: Jan. 8, 2013

(54) STEERABLE PARAVANE SYSTEM FOR TOWED SEISMIC STREAMER ARRAYS

(75) Inventors: Jan Erik Stokkeland, Heggedal (NO); Ole-Fredrik Semb, Borgheim (NO)

(73) Assignee: PGS Geophysical AS, Lysaker (NO)

(*) Notice: Subject to any disclaimer, the term of this patent is extended or adjusted under 35 U.S.C. 154(b) by 178 days.

(21) Appl. No.: 12/927,534

(22) Filed: Nov. 17, 2010

(65) Prior Publication Data

US 2011/0139055 A1 Jun. 16, 2011

Related U.S. Application Data

(62) Division of application No. 11/894,387, filed on Aug. 21, 2007, now Pat. No. 7,881,153.

(51) Int. Cl.
*G01V 1/38* (2006.01)

(52) U.S. Cl. .......................... 367/18; 114/253

(58) Field of Classification Search .............. 367/15–19; 114/253
See application file for complete search history.

(56) References Cited

U.S. PATENT DOCUMENTS

| | | | |
|---|---|---|---|
| 4,481,611 A | 11/1984 | Burrage | |
| 4,574,723 A * | 3/1986 | Chiles et al. | 114/253 |
| 4,890,568 A | 1/1990 | Dolengowski | |
| 5,050,459 A | 9/1991 | Ishikawa et al. | |
| 6,305,308 B1 | 10/2001 | Kristiansen et al. | |
| 7,156,035 B2 | 1/2007 | Hocquet et al. | |
| 7,404,370 B2 | 7/2008 | Stokkeland | |
| 7,425,186 B2 | 9/2008 | Lemberger | |
| 7,658,161 B2 | 2/2010 | Toennessen et al. | |
| 7,660,190 B2 | 2/2010 | Keskes et al. | |
| 7,738,317 B2 | 6/2010 | Toennessen | |
| 2009/0050044 A1 | 2/2009 | Stokkeland et al. | |

FOREIGN PATENT DOCUMENTS

| | | |
|---|---|---|
| EP | 0168959 A1 | 6/1985 |
| GB | 2122562 A | 6/1983 |
| GB | 2399883 A | 9/2004 |
| GB | 2440636 A | 2/2008 |
| WO | 9825162 A1 | 6/1998 |

OTHER PUBLICATIONS

Doko, Asami, Yagi: "Effects of Precipitate Particles on Structure Evolution During Hot Rolling of 3003 Aluminum Alloy," Light Metals (1988) pp. 386-393, 38[7].

Li, Arnberg: "Evolution of Primary Particles in DC-Cast AA3003 Alloy During Heating and Homogenization," Light Metals (2002), pp. 765-770, TMS.

Shankar, Makhlouf: "Evolution of the Eutectic Microstructure During Solidification of Hypoeutectic Aluminum-Silicon Alloys," www.wpi.edu (2003) Metal Processing Inst.-WPI.

Minoda, Yoshida: "The Influence of Ingot Homogenization on the Microstructure of 3003 Aluminium Alloy Extrusion," Sumitomo Light Metal Tech Repts (Dec. 1988), pp. 20-25, 39[1].

Lloyd: "Recrystallization of Unhomogenized Aluminium-Manganese Alloys," Metal Science (Jun. 1982), pp. 304-308, vol. 16.

* cited by examiner

*Primary Examiner* — Isam Alsomiri
*Assistant Examiner* — Krystine Breier

(57) ABSTRACT

A paravane for a seismic acquisition system includes a float, a frame suspended from the float, deflectors affixed to the frame, and means for coupling a tow rope to a lead-in functionally extending between a forward end and an aft end of the frame. The paravane includes means for selectively changing an effective position along the lead-in of the means for coupling the tow cable.

11 Claims, 12 Drawing Sheets

STEERABLE PARAVANE SYSTEM FOR TOWED SEISMIC STREAMER ARRAYS

CROSS-REFERENCE TO RELATED APPLICATIONS

This application is a divisional application and claims the benefit under 35 U.S.C. §121 of U.S. patent application Ser. No. 11/894,387, filed Aug. 21, 2007 now U.S. Pat. No. 7,881,153, which is herein incorporated by reference.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey systems.

More particularly, the invention relates to paravanes used to exert controllable lateral force on a seismic streamer array.

2. Background Art

Marine seismic survey systems are used to acquire seismic data from Earth formations below the bottom of a body of water, such as a lake or the ocean. Marine seismic survey systems known in the art typically include a seismic vessel having onboard navigation, seismic energy source control, and data recording equipment. The seismic vessel is typically configured to tow one or more seismic sensor "streamers" (long cables with sensors at spaced apart locations along the cable) through the water. At selected times, the seismic energy source control equipment causes one or more seismic energy sources, which may be towed in the water by the seismic vessel or by another vessel, to actuate. Signals produced by the sensors in the one or more streamers ultimately in response to energy from the seismic source are conducted by electrical, radio and/or optical telemetry to the recording equipment, where a record indexed with respect to source actuation time is made of the signals produced by each sensor (or groups of such sensors). The recorded signals are later interpreted to infer the structure and/or composition of the Earth formations below the bottom of the body of water.

As explained above, the one or more streamers are in the most general sense long cables that have seismic sensors disposed at spaced apart positions along the length of the cable. A typical streamer can extend behind the seismic vessel for several kilometers. More recently, marine seismic acquisition systems have been designed that include a number of such streamers towed by the seismic vessel parallel to each other. A typical multiple streamer system includes a plurality of "lead-in cables" each coupled to a forward end of one of the streamers. The lead-in cables are used to deploy the streamers from the seismic vessel and to maintain the streamers at a selected distance behind the vessel.

The streamers are fixed near their forward ends to a spreader cable or "super wide" cable. The spreader cable extends in the water transversely to the direction of motion of the vessel, and when maintained in the correct tension, substantially fixes the relative lateral positions of the forward ends of the streamers. The spreader cable is maintained in tension by a device coupled to each end of the spreader cable called a paravane.

The paravanes include diverters or similar suitably-shaped deflecting plates that redirect the motion of the water past the paravane laterally to produce some amount of lateral force ultimately applied to the spreader cable. The lateral force exerted by the paravanes is related to the shape and orientation of the deflecting plates and the speed of motion of the paravanes through the water. One issue of concern to seismic survey system operators using paravanes known in the art is that the lateral force exerted by the outermost paravane when the vessel turns can be excessive at ordinary towing speeds because the outermost paravane will be moving considerably faster than the vessel, depending on the lateral distance between such paravane and the centerline of the vessel. Thus, using paravanes known in the art, it is frequently necessary to limit the vessel speed during turns, thus reducing the efficiency with which a survey can be performed. Where there are water currents that move in a direction along the direction of motion of the seismic vessel, the amount of lateral force exerted by paravanes known in the art will increase with current flow opposite the vessel direction because of the increased water velocity past the paravane, or will decrease with water current flow in the same direction as the seismic vessel motion because of decreased water velocity past the paravane. Where there are water currents moving transversely to the direction of motion of the seismic vessel, the seismic streamer array may be moved laterally in a manner that is difficult for the system operator to compensate or control.

It is also known in the art that the most suitable configuration for the array of cables that ultimately couples the paravanes to the spreader cable (called a "bridle") and/or tow rope may vary depending on the particular paravane used, and on actual vessel motion conditions. In the event the bridle actually used in any survey is not optimal for the existing equipment configuration and survey conditions, it is frequently necessary to retrieve the paravane and reconfigure the bridle. Such retrieval and reconfiguration operations can be costly and time consuming.

There continues to be a need for improved structures for paravanes and bridles to increase seismic survey efficiency.

SUMMARY OF THE INVENTION

A paravane for a seismic acquisition system according to one aspect of the invention includes a float, a frame suspended from the float, deflectors affixed to the frame, and means for coupling a tow rope to a lead-in functionally extending between a forward end and an aft end of the frame. The paravane includes means for selectively changing an effective position along the lead-in of the means for coupling the tow cable.

Another aspect of the invention is a paravane for a seismic acquisition system. A paravane according to this aspect of the invention includes a float, a frame suspended from the float, deflectors affixed to the frame, and a bridle coupled to the frame at selected positions. The bridle includes at least one cable coupled at one end proximate a forward end of the frame and at least one cable coupled at one end proximate an aft end of the frame. Means coupled to the other end of each of the forward and aft cables are provided for selectively changing an effective tow point between the other ends of the forward and aft cables.

A marine seismic survey system according to another aspect of the invention includes a seismic vessel. A plurality of seismic sensor streamers are towed by the vessel at laterally spaced apart positions. A spreader cable extends substantially transversely to a direction of motion of the seismic vessel. Each of the streamers coupled at its forward end to the spreader cable. A paravane is coupled to each end of the spreader cable. Each paravane includes a frame suspended from the float, at least one deflector affixed to the frame and a bridle coupled to the frame at selected positions. The bridle includes at least one cable coupled at one end proximate a forward end of the frame and at the other end proximate an aft end of the frame. The paravane includes means functionally associated with the cable for selectively changing an effective tow point between the ends of the cable. A tow rope is coupled to the tow point of each bridle at one end and at the other end thereof to the seismic vessel.

A method for controlling a lateral force exerted by a paravane towed by a vessel includes moving the vessel through a body of water, coupling motion of the vessel to an effective tow point associated with a first paravane and changing the effective tow point of the first paravane to provide a selected angle of attack thereof.

One embodiment of controlling the effective tow point includes the following. Motion of the vessel is coupled through a tow rope to a coupling point on a bridle. The bridle includes at least one cable coupled at a first end to the coupling point and at a second end proximate a forward end of the paravane. The bridle includes at least one cable coupled at a first end to the coupling point and at a second end proximate an aft end of the paravane. The method includes selectively changing a distance between the coupling point and the first end of each of the forward coupled and aft coupled cables, thereby changing the angle of attack of the paravane in the water.

Other aspects and advantages of the invention will be apparent from the following description and the appended claims.

DETAILED DESCRIPTION

Figure 1:
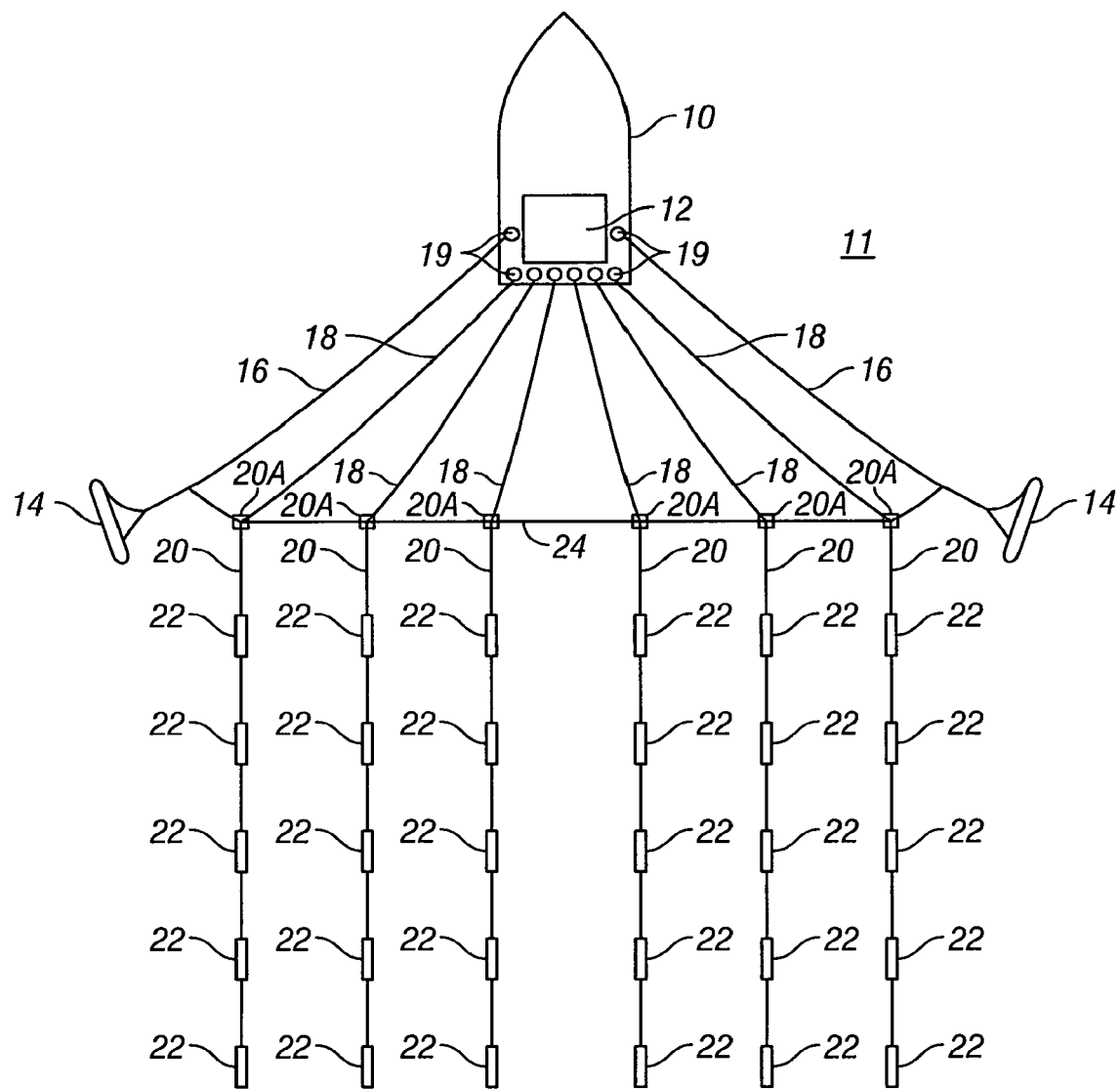
FIG. 1 shows a plan view of a typical marine seismic survey system that can include steerable paravanes according to the invention.

FIG. 1 shows a typical marine seismic survey system that can include paravanes and paravane connecting bridles according to the various aspects of the present invention. The acquisition system includes a seismic vessel 10 that moves along the surface of a body of water 11 such as a lake or the ocean. The seismic vessel 10 may include thereon certain electronic equipment, shown at 12 and for convenience collectively called a "recording system." The recording system 12 typically includes a recording unit for making a record with respect to time of signals generated by various seismic sensors in the acquisition system. The recording system 12 also typically includes navigation equipment to determine at any time the position of the vessel 10 and each of a plurality of seismic sensors 22 disposed at spaced apart locations on streamers 20 towed by the vessel 10. The foregoing elements of the recording system 12 are familiar to those skilled in the art and are not shown in the figures for clarity of the illustration. In the present invention, the recording unit 12 may also include devices for controlling operation of a paravane steering device, as will be further explained below.

The seismic sensors 22 can be any type of seismic sensor known in the art such as motion responsive sensors, acceleration sensors, pressure sensors, pressure time gradient sensors or any combination thereof. The seismic sensors 22 measure seismic energy primarily reflected from various structures in the Earth's subsurface below the bottom of the water 11. The seismic energy originates from a seismic energy source (not shown) deployed in the water 11. The recording system 12 may also include seismic energy source control equipment (not shown separately). One or more seismic energy sources (not shown in the figures for clarity) may be towed by the seismic vessel 10 or by another vessel (not shown) nearby.

In the seismic data acquisition system shown in FIG. 1, there are six seismic sensor streamers 20 towed by the seismic vessel 10. The number of seismic sensor streamers may be different in any particular implementation of an acquisition system according to the various aspects of the invention, therefore, the number of streamers shown in FIG. 1 is not intended to limit the scope of the invention. As explained in the Background section herein, in seismic acquisition systems such as shown in FIG. 1 that include a plurality of laterally spaced apart streamers, the streamers 20 are coupled to towing equipment that maintains the streamers 20 at selected lateral positions with respect to each other and with respect to the seismic vessel 10. As shown in FIG. 1, the towing equipment can include two paravane tow ropes 16 each coupled to the vessel 10 at one end through a winch 19 or similar spooling device that enables changing the deployed length of each paravane tow rope 16. The other end of each paravane tow rope 16 is functionally coupled to a paravane 14, typically through a set of cables called a "bridle", which will be further explained herein. The paravanes 14 are each configured to provide a lateral component of motion to the various towing components deployed in the water 11 when the paravanes 14 are towed in the water 11, and as will be explained below, in various aspects of the present invention such lateral component of motion can be adjustable or controllable. Lateral in the present description means essentially transverse to the direction of motion of the vessel 10. The lateral motion component of each paravane 14 is opposed to that of the other paravane 14, and is generally in a direction outward from the centerline of the vessel 10. The combined lateral motion of the paravanes 14 separates the paravanes 14 from each other until they put one or more spreader ropes or cables 24, functionally coupled end to end between the paravanes 14, into tension.

As used in the present description, the term "cable" generally means a device that includes one or more electrical and/or optical conductors therein for carrying electrical power and/or or signals from the vessel 10 to and/or from various components of the seismic acquisition system. A cable as used in the present context may also include various forms of armor or other device to carry axial loading along the cable, and thus may be a load bearing part of the acquisition system. The term "rope" is generally used in the present description to refer to a flexible, axial load carrying member that does not include any form of electrical and/or optical conductor, and as such is used essentially only to carry axial loading. Such rope may be made from fiber, steel or other high strength metal, or combinations thereof. In typical multiple-streamer acquisition systems, such as shown in FIG. 1, the laterally outermost towing elements, the paravane tow ropes 16 are in fact typically ropes as defined above. However, such configuration is not meant to limit the scope of this invention. Other embodiments within the scope of this invention may provide cables at the laterally outermost towing positions coupled between the paravanes 14 and the seismic vessel 10 as shown in FIG. 1. Therefore, as used herein, the tow rope 16 may also be cables.

The streamers 20 are each coupled, at the axial ends thereof nearest the vessel 10 (forward ends), to a respective lead-in cable termination 20A. The lead-in cable terminations 20A are coupled to or are associated with the spreader ropes or cables 24 so as to fix the lateral positions of the streamers 20 with respect to each other and with respect to the vessel 10. Electrical and/or optical connection between the appropriate components in the recording system 12 and, ultimately, the sensors (and/or other circuitry) in the ones of the streamers 20 inward of the lateral edges of the system may be made using inner lead-in cables 18, each of which terminates in a respective lead-in cable termination 20A. A lead-in termination 20A is disposed at the vessel end of each streamer 20. Corresponding electrical and/or optical connection between the appropriate components of the recording unit 12 and the sensors 22 in the streamers 20 may be made, through respective lead-in terminations 20A, using lead-in cables 18. Each of the lead-in cables may be deployed by a respective winch 19 or similar spooling device such that the deployed length of each cable 18 can be changed.

As will be readily appreciated by those skilled in the art, the actual lateral separation between the streamers 20 is related to the tension on the spreader ropes or cables 24. In one aspect of the invention, the paravanes 14, in cooperation with an adjustable device associated with a paravane bridle (explained in more detail below with reference to FIGS. 3 through 9) can be "steered" to exert adjustable lateral force, such that the tension on the spreader cables 24 can be controlled, and/or the lateral position of the acquisition system components can be maintained with respect to the seismic vessel.

Figure 2:
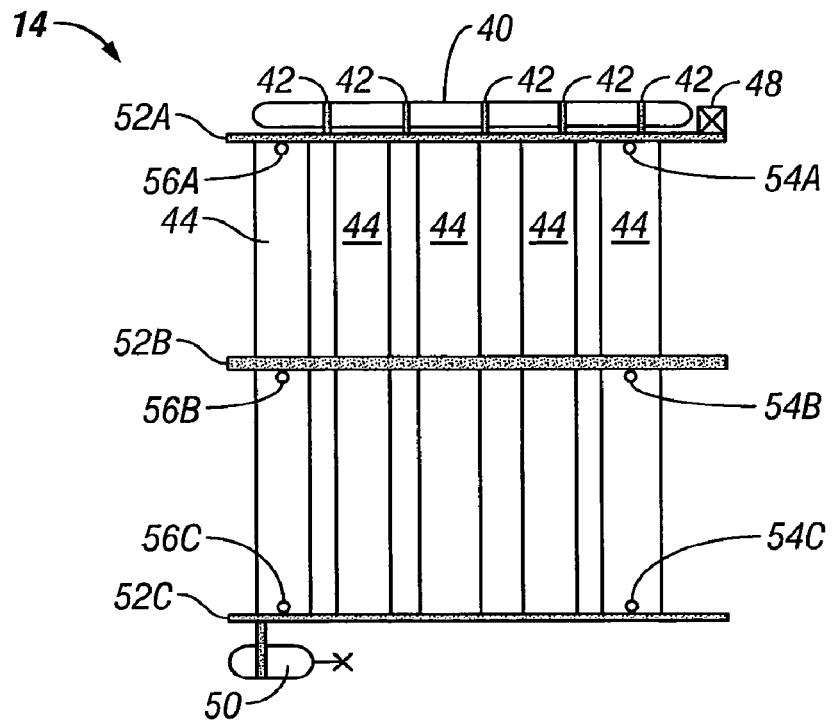
FIG. 2 shows one embodiment of a paravane.

FIG. 2 shows a cross section of one embodiment of a paravane. The paravane 14 includes several principal components, including a generally longitudinally extending float or buoy 40 that maintains the paravane 14 in a selected position with respect to the water surface and buoyantly supports the remainder of the components of the paravane 14. The float 40 can be coupled, for example, by clamps, brackets or bands 42 to an upper diverter frame 52A. The upper diverter frame 52A provides mounting and support for the uppermost ends of a plurality of substantially vertically extending diverters 44, each of which has a selected shape and orientation with respect to the longitudinal axis of the paravane 14 to redirect movement of water as the paravane 14 is towed by the vessel (10 in FIG. 1). Such redirection of the water movement results in lateral force being generated by the paravane 14. In the present embodiment, the diverters 44 can be supported approximately in their longitudinal center by a center diverter frame 52B, and at their lower longitudinal ends by a lower diverter frame 52C. Collectively, the frames 52A, 52B, 52C maintain the position of and the orientation of the diverters 44 with respect to the float 40. The diverters 44 are rigidly mounted in the frames 52A, 52B, 52C such that the amount of lateral force generated depends essentially entirely on the speed of the paravane 14 through the water.

Each diverter frame 52A, 52B, 52C may include respective forward bridle cable couplings, such couplings shown at 56A, 56B, 56C, and aft bridle cable couplings, such couplings shown at 54A, 54B, 54C. An arrangement of a bridle and associated cables according to another aspect of the invention will be explained below with reference to FIG. 3.

In the present embodiment, electrical power to operate various electronic components in a directional controller unit 48 may be supplied by a turbine-powered generator, shown generally at 50 and affixed to the lower frame 52C. The generator 50 converts flow of the water past the paravane 14 into rotational energy to drive an electric alternator or generator (not shown separately) disposed therein and collectively referred to as a "generator." The exact structure and location on the paravane 14 chosen for the generator 50 and for the controller unit 48 are matters of discretion for the designer and are not intended to limit the scope of the invention. The controller unit 48 will be explained in more detail with reference to FIG. 10.

As will be appreciated by those skilled in the art, part of the lateral force produced by the paravane 14 as it moves through the water, as well as the towing force supplied by the vessel (10 in FIG. 1) are generally coupled to the vessel (10 in FIG. 1) through the paravane tow rope (16 in FIG. 1). Typically, such forces are distributed over a substantial portion or all of the cross-sectional area of the paravane structure, rather than being concentrated at a single coupling point, by coupling the tow rope (16 in FIG. 1) to the paravane 14 using a device called a bridle. The bridle, one embodiment of which will be further explained below, typically includes a plurality of cables or ropes that each terminate at one end in one of the bridle cable couplings 54A, 54B, 54C and 56A, 56B, 56C, and each terminate at the other end in one or more bridle "nodes."

Figure 3:
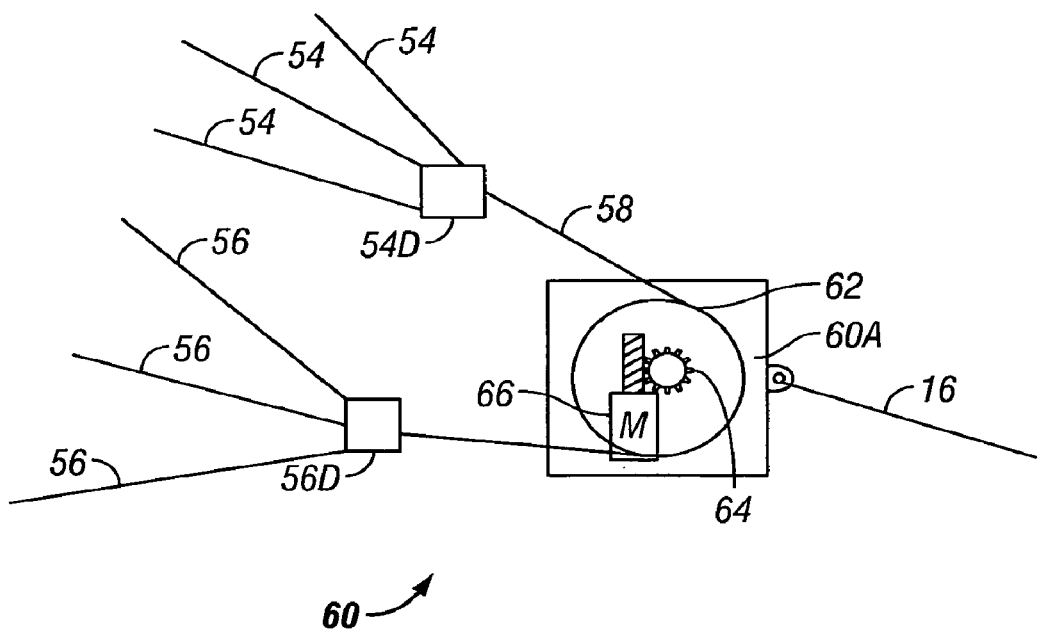
FIG. 3 shows an adjustable position bridle that can be used with the paravane shown in FIG. 2.

For purposes of describing the forces on the paravane 14 and on the bridle cables, each bridle node acts as a single point. In the invention there are two such bridle nodes in each bridle, a forward node and an aft node. Each such node itself can be functionally coupled to the tow rope (16 in FIG. 1) by a cable or chain. Referring to FIG. 3, one example of an adjustable system that may be used with the paravane of FIG. 2 will now be explained. As explained above, bridle cables, shown at 54 for the aft bridle cables and 56 for the forward bridle cables respectively, each couple at one end to a respective coupling (54A, 54B, 54C and 56A, 56B, 56C in FIG. 2) on the paravane diverter frames (52A, 52B, 52C in FIG. 2). Also as explained above, the bridle cables 54 and 56 are coupled at their other ends to a respective bridle node, shown at 54D for the aft node and at 56D for the forward node. The nodes 54D, 56D are each coupled to one end of a node lead-in line 58 which may be a cable or chain. The particular structure used for the lead-in line 58, and the particular device used to control the length of the respective portions of the lead-in line 58 are a matter of discretion for the system designer. For purposes of defining the scope of this aspect of the invention, it is only necessary that the length of lead-in line 58 between the coupling point to the tow rope 16 (referred to for convenience as the "tow point") and to each of the forward node 56D and the aft node 54D be controllable so as to be able to control the effective position of the tow point between the end of the tow rope 16 and the nodes 54D, 56D. It should also be understood that the nodes 56D, 54D are used to couple cables to distribute forces across the entire forward and aft end, respectively, of the diver frames. In principle, the invention operates by selectively moving the effective tow point between the forward and aft ends of the paravane.

The effective tow point of the tow rope 16 in the present embodiment can be moved with respect to the paravane in the present using a node position controller 60. The node position controller 60 in this embodiment provides that the node lead-in line 58 can be coupled at each of its ends to one of the nodes 54D, 56D, thus effectively coupling each end of the node lead-in line 58 to a respective end of the paravane. The node lead-in line 58 can also be wrapped around a sheave or sprocket 62 rotatably mounted within a frame 60A. A sheave is typically used when the node lead-in line 58 is in the form of a rope, wire rope or a cable. A sprocket is typically used when the node lead-in line 58 is in the form of a chain. The frame 60A is functionally coupled to the distal end of the tow rope 16 and transmits towing force from the tow rope 16 to the sheave or sprocket 62, which then transmits towing force to each end of the node lead-in line 58, and thus ultimately to each node 54D, 56D and to the respective ends of the paravane. In the present embodiment, the distribution of tow forces on each set of the forward bridle cables 56 and aft bridle cables 54 can be changed by changing the distance between each node 54D, 56D and the frame 60A. Such distance change in the present embodiment is effected by rotation of the sheave or sprocket 62, thus changing relative length of each segment of the node lead-in line 58.

Rotation of the sheave or sprocket 62 in the example shown in FIG. 3, may be effected by a motor/worm gear combination 66 rotationally coupled to a spur gear 64. The spur gear 64 may be rotationally fixed to the sheave or sprocket 62, such that rotation of the spur gear 64 causes corresponding rotation of the sheave or sprocket 62. The motor in the motor/worm gear combination 66 may be an electric motor, pneumatic motor or hydraulic motor. Although other arrangements of motor may be used to rotate the sheave or sprocket 62, a motor/worm gear combination is preferred because such combination will substantially prevent tension on the node lead-in line 58 from affecting the rotational position of the sheave or sprocket 62, thus maintaining the lengths of the forward and aft segments of the lead-in line 58 fixed. Operation of the motor in the motor/worm gear combination 66 may be performed by selected circuits (not shown) in a control unit (48 in FIG. 2 and FIG. 10), as will be explained in more detail below. Another example that uses one or more servo motors coupled to a sprocket using a planetary gear unit will be further explained with reference to FIG. 7 and FIGS. 8A through 8D. Other devices for rotating the sheave or sprocket 62 may include, for example, suitably linked hydraulic or pneumatic cylinders.

Figure 5:
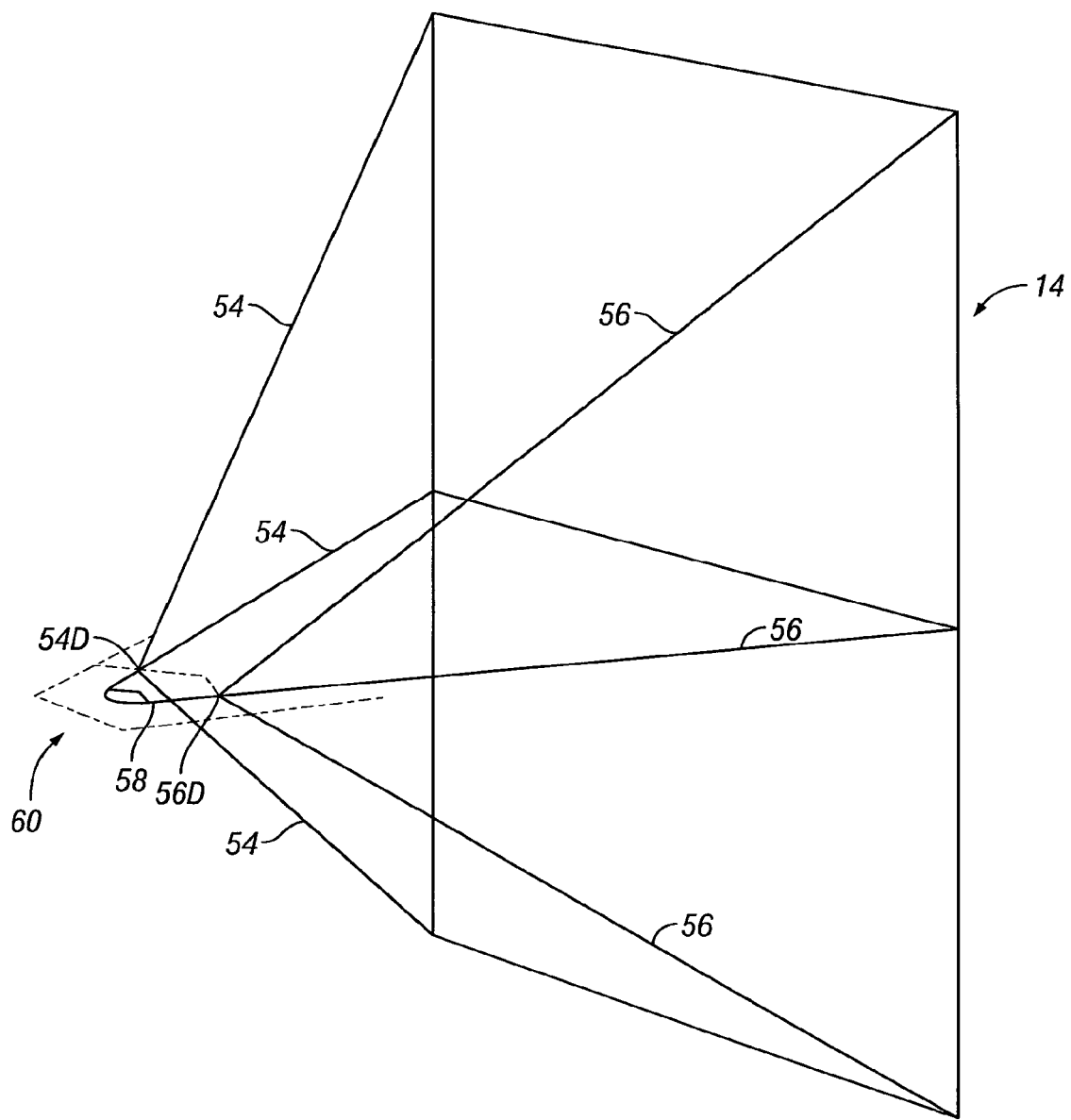
FIG. 5 shows an arrangement of a bridle coupled to a paravane diverter frame using a node position controller.

An example arrangement of the bridle cables 54, 56 when coupled to their respective couplings on the diverter frames (52A, 52B, 52C in FIG. 2) and node position controller 60 is shown schematically in FIG. 5. Operating the node position controller 60 to change the relative length of the node lead-in line 58 between the tow point and each node 54D, 56D will change the "angle of attack" of the paravane (14 in FIG. 1) as it moves through the water by changing the effective tow point of the paravane (14 in FIG. 1) with respect to the end of the tow rope (16 in FIG. 1).

Figure 4:
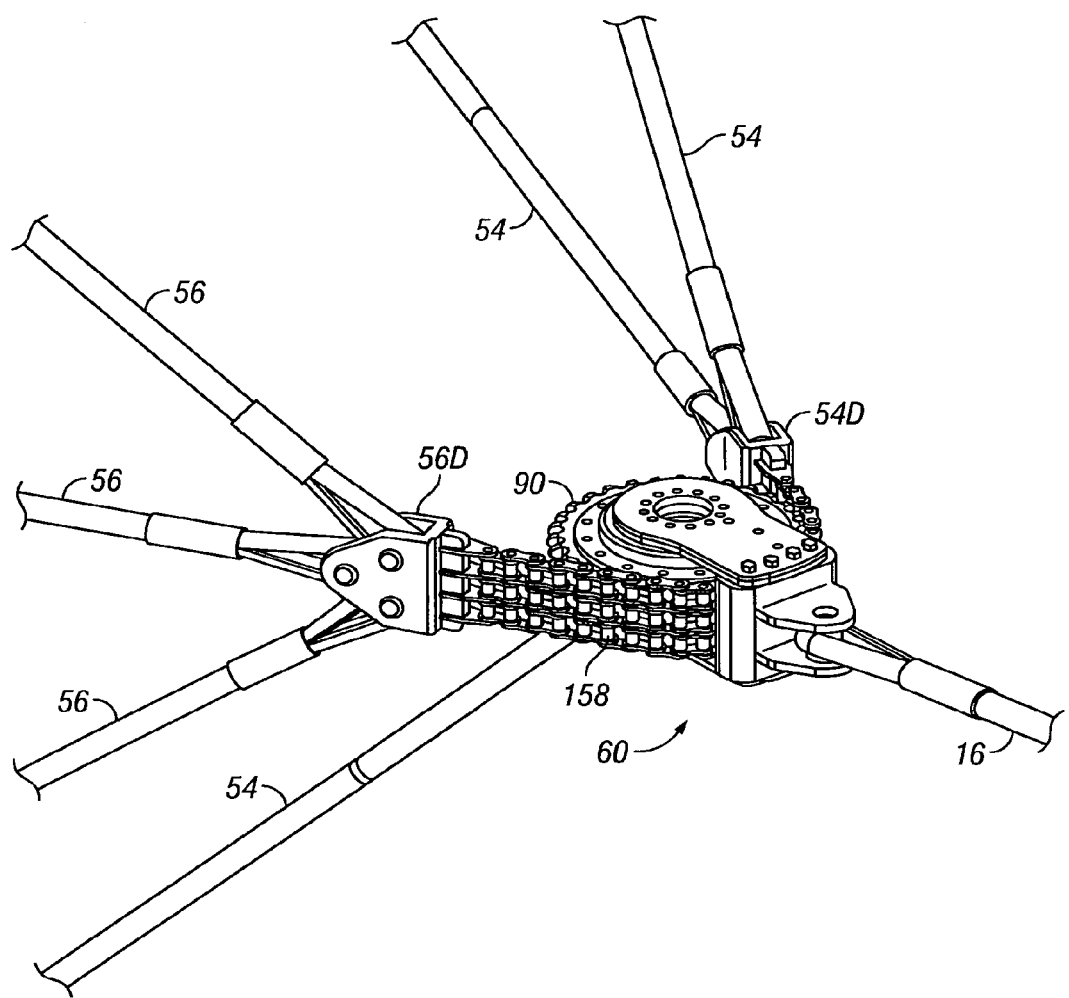
FIG. 4 shows one example of a node position controller coupled to a bridle and a tow rope.

One particular example of a node position controller 60 is shown in oblique view in FIG. 4. The node position controller 60 in the present example may use a chain 158 as the node lead-in line (58 in FIG. 3) and such chain 158 may be moved relative to the node position controller 60 by rotating a sprocket 90 that is rotatably affixed to the frame (60A in FIG. 3). Rotating the sprocket 90 will cause the length of the chain 158 disposed between the tow rope 16 and each node 54D, 56D to change correspondingly. The example node position controller, nodes and their functional components will be explained in more detail below with reference to FIGS. 6A through 9.

Figure 6B:
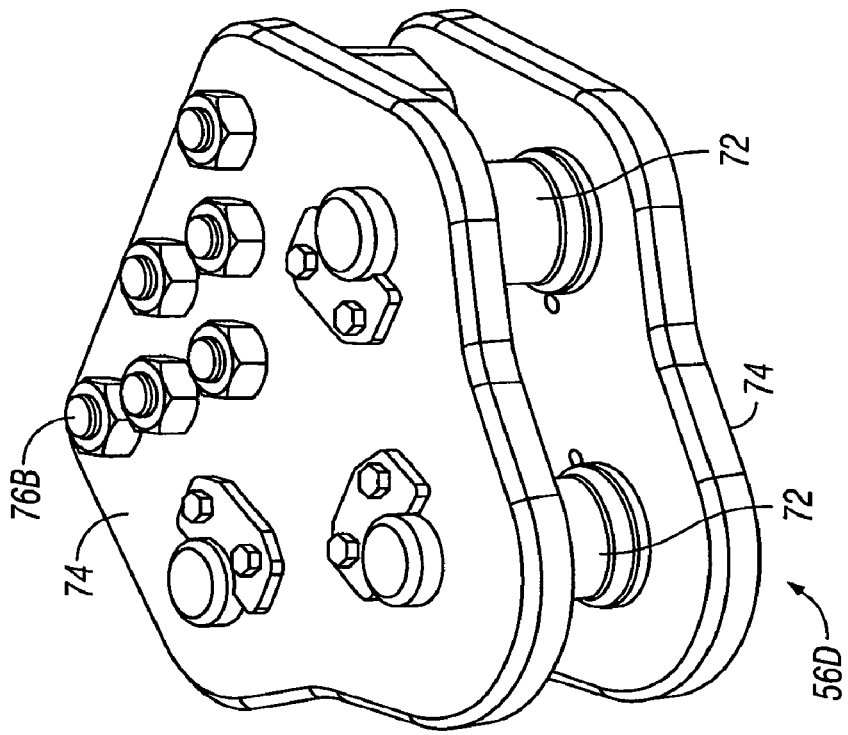
FIGS. 6A and 6B show one example of a bridle node.
Figure 6A:
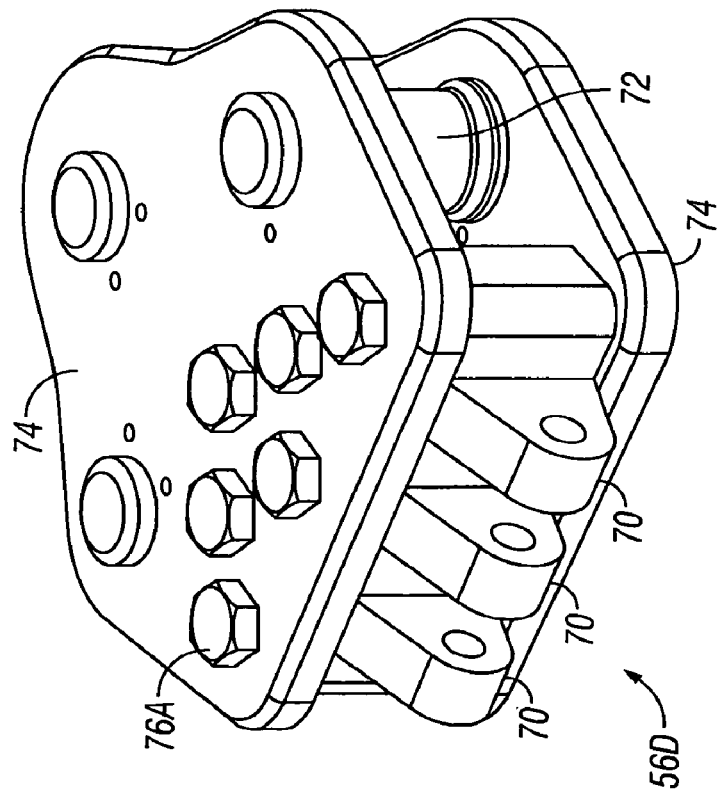

FIGS. 6A and 6B show opposed oblique views of one of the nodes 56D. The node 56D may be assembled from two spaced apart plates 74. The plates 74 may include features (not shown separately) configured to retain the bridle cables (54 and 56 in FIG. 3) such as cable retainer pins 72. The cable retainer pins 72 may each include a larger diameter portion (not shown separately) disposed between the plates 74 and smaller diameter portions on the longitudinal ends of the cable retainer pins 72 that may pass through corresponding openings (not shown separately) in the plates 74. Thus when the plates 74 are coupled together, such as by cap screws 76A (FIG. 6A) and nuts 76B (FIG. 6B), the cable retainer pins 72 will be retained in between the plates 74. The cable retainer pins 72 thus act as spacers to keep the plates 74 at a selected lateral distance from each other. A chain end link 70 may also be retained between the plates 74. The chain end link 70 may include through passages (not shown separately) for the cap screws 76A (FIG. 6A) such that the chain end link 70 may be held in place by the cap screws 76A as well as forming a spacer to keep the plates 74 laterally spaced apart by a selected amount. The bridle cables (56 in FIG. 3) may be retained on the cable retainer pins 72 by forming a spliced eye in the end of each bridle cable (56 in FIG. 3) in a manner well known in the art.

Figure 7:
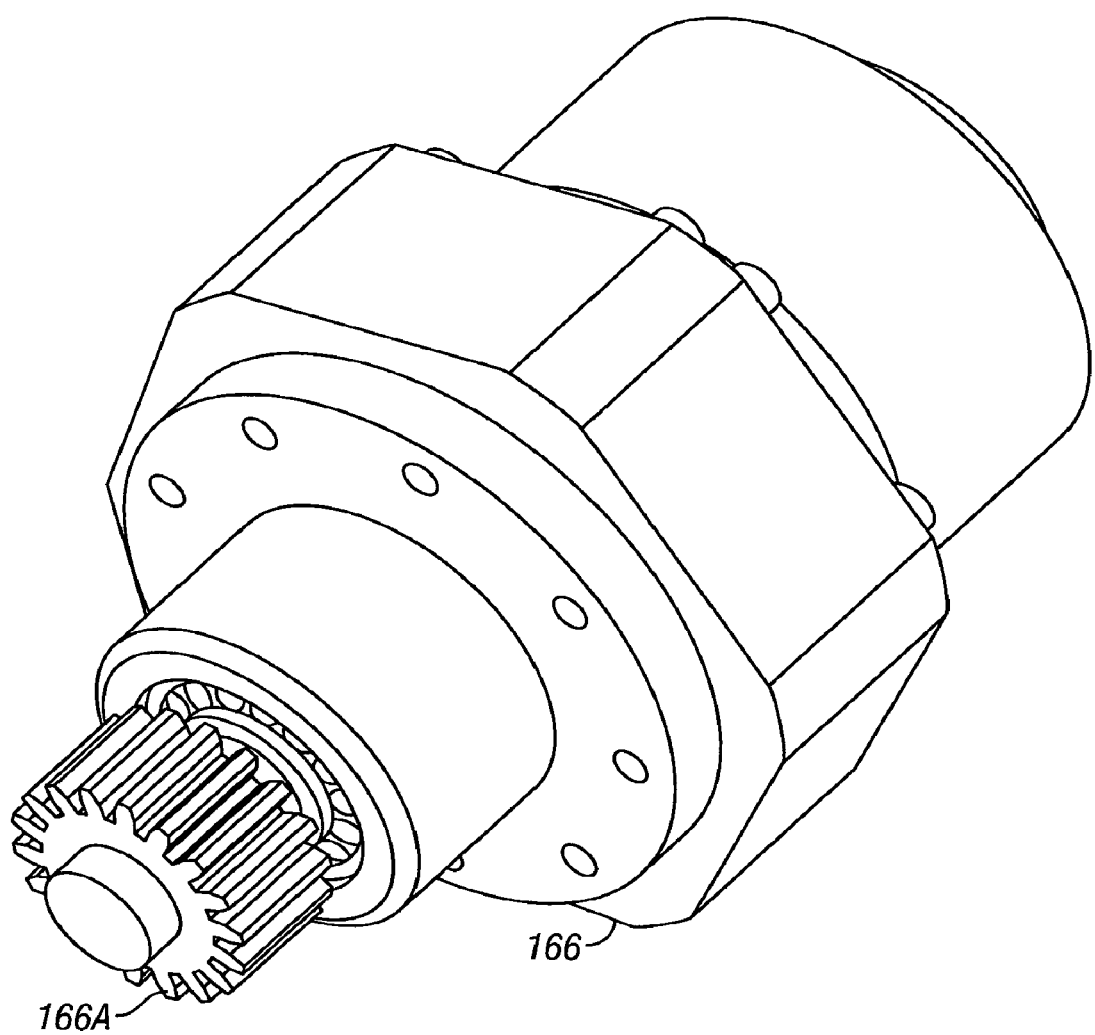
FIG. 7 shows a motor/gear combination that may be used with various examples of a node position controller.

One example of a motor that may be used in the present implementation is shown in FIG. 7. The motor 166 may be a direct current ("DC"), brushless servo motor with integral or separate motor controller. The output shaft of the motor 166 may include a spur gear 166A pressed or otherwise affixed directly thereon. The spur gear 166A can be configured to engage a planetary gear unit that will be explained below in more detail with reference to FIGS. 8A through 8C. Rotation of the motor 166 is thereby gear-coupled to the sprocket (90 in FIG. 4). The exact type of motor used in any example may be a matter or discretion for the system designer and therefore the type of motor is not a limit on the scope of the present invention. As a practical matter it is only necessary to provide rotational power selectively in each direction to the sprocket in order for the node position controller to work. Other examples may include induction motors, hydraulic motors or pneumatic motors.

Figure 8A:
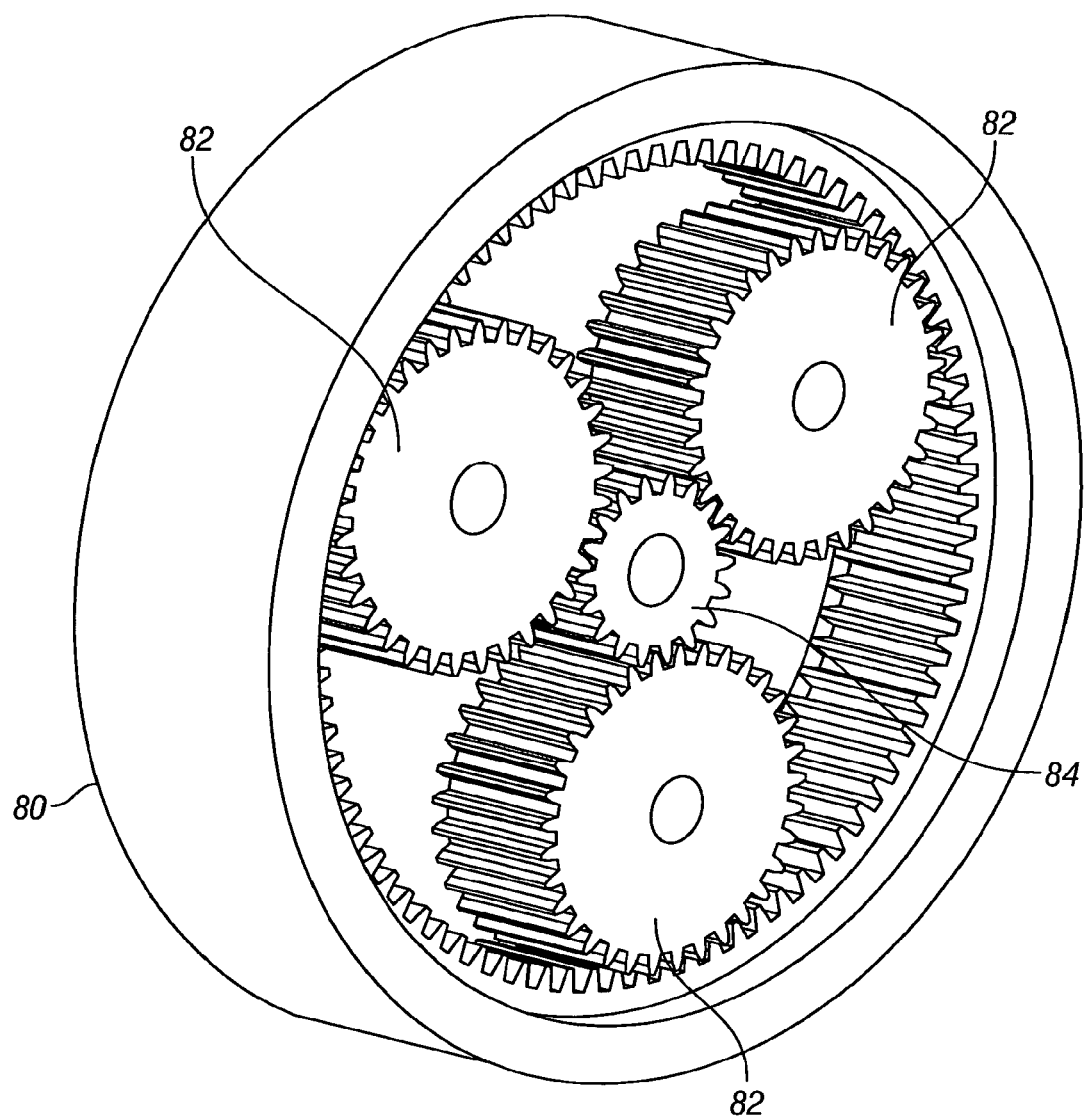
FIGS. 8A, 8B and 8C show various components of a planetary reduction gear used to convert motion of the motor of FIG. 7 to driving force to rotate the sprocket shown in FIG. 4.
Figure 8B:
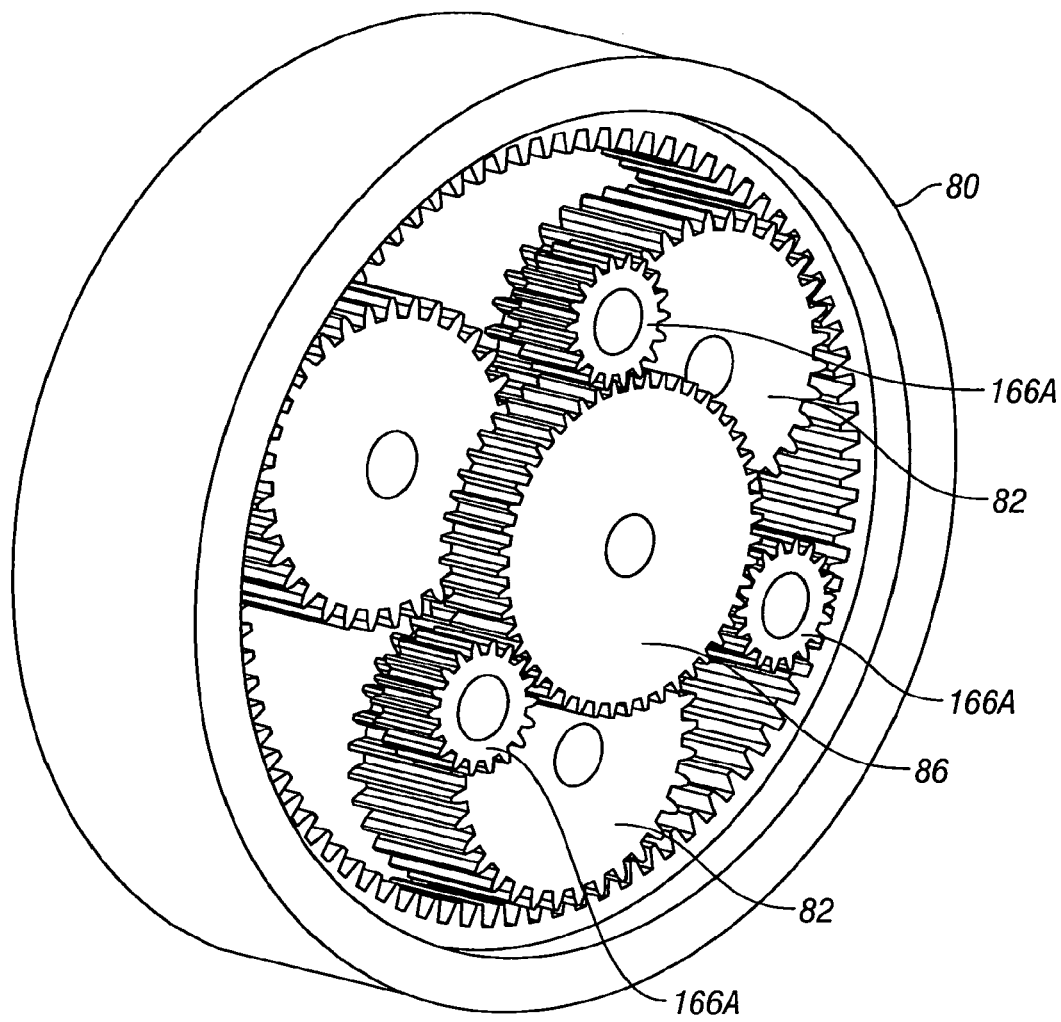

The planetary gear unit may be a multiple stage unit to provide very high output torque to drive the sprocket (90 in FIG. 4) using only a relatively low torque electric motor or motors. An output stage of the planetary gear unit is shown in oblique view in FIG. 8A. A ring gear 80 having internal teeth surrounds and makes tooth contact with three planet gears 82. The planet gears 82 surround and are in tooth contact with a centrally positioned sun gear 84. The sun gear 84 is the driving element of the output stage of the gear unit, and it is itself driven by the output of a first stage of the gear unit. The first stage of the planetary gear unit is shown on top of the output stage in FIG. 8B. In FIG. 8B, the sun gear (84 in FIG. 8A) is obscured from view because it is coaxially coupled below the plane of a driven gear 86 in the input stage. The driven gear 86 may be rotated by power from three motors (such as the one shown at 166 in FIG. 7) arranged such that their output shafts, each with a spur gear 166A thereon are in geared contact with the driven gear 86. Thus, rotation of the motors (see 166 in FIG. 9) is coupled through spur gears 166A to the driven gear 86. The driven gear 86 directly rotates the sun gear (84 in FIG. 8A. The sun gear (84 in FIG. 8A) rotates the planet gears 82, which ultimately rotate the ring gear 80 at a much lower speed and much higher torque than speed and torque applied by the motors (166 in FIG. 7).

Figure 8C:
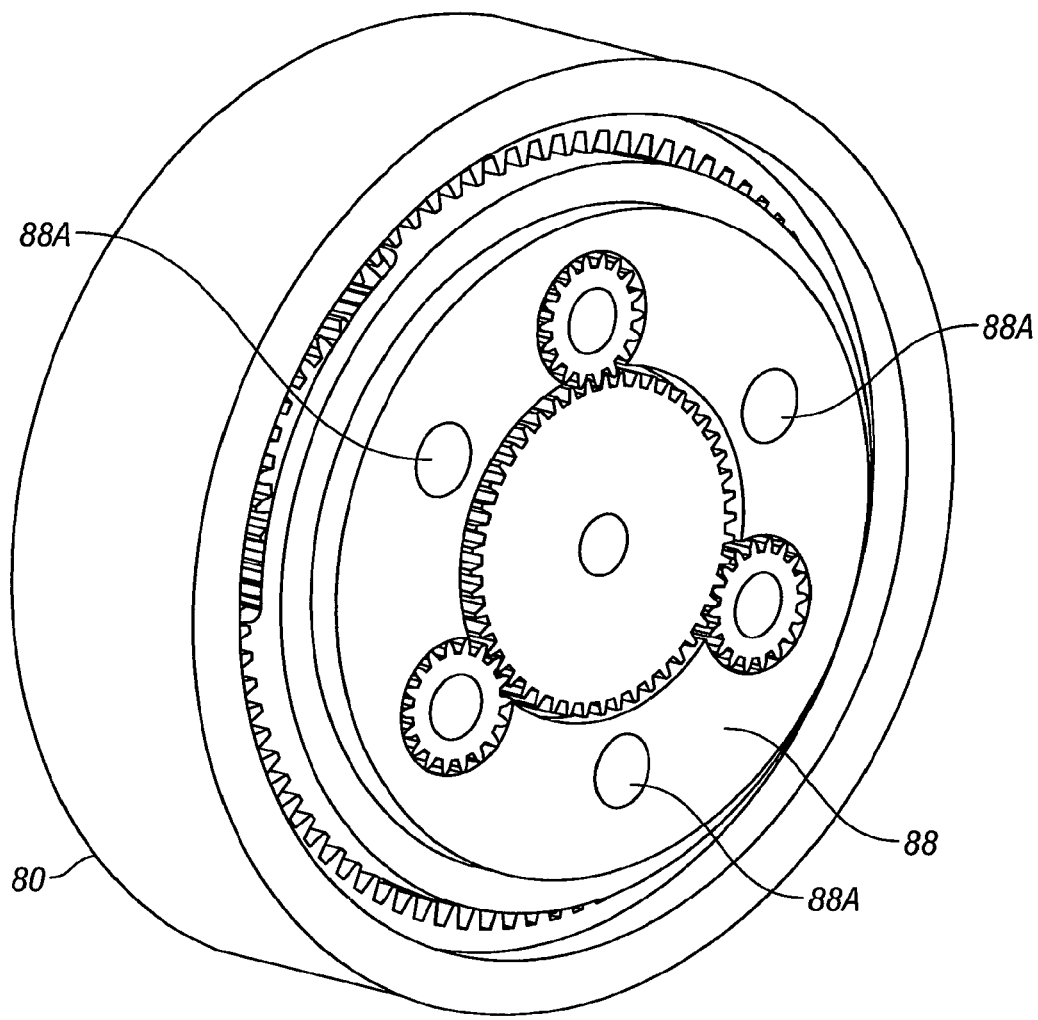
Figure 8D:
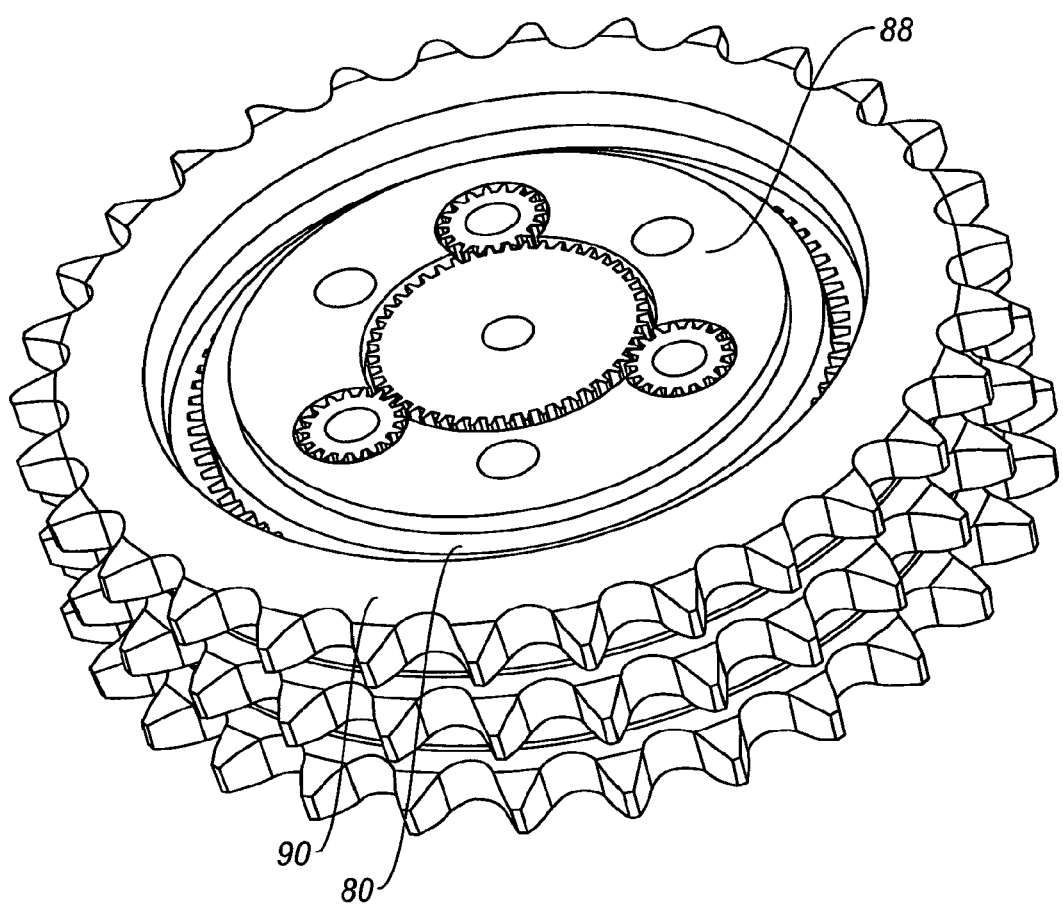
FIG. 8D shows the sprocket coupled to the planetary gear of FIGS. 8A through 8C.

Referring to FIG. 8C, the planet gears (82 in FIG. 8A) may be maintained in their relative circumferentially spaced positions around the sun gear (84 in FIG. 8A) and inside the ring gear 80 by using a planet carrier 88. The planet gears (82 in FIG. 8A) are each constrained to rotate about a spindle or axle 88A coupled to or formed into the body of the planet carrier 88. In FIG. 8D, the sprocket 90 may be affixed to the exterior of the ring gear 80 and thus be caused to rotate with the ring gear 80 when the motors (166 in FIG. 9) are operated.

Figure 9:
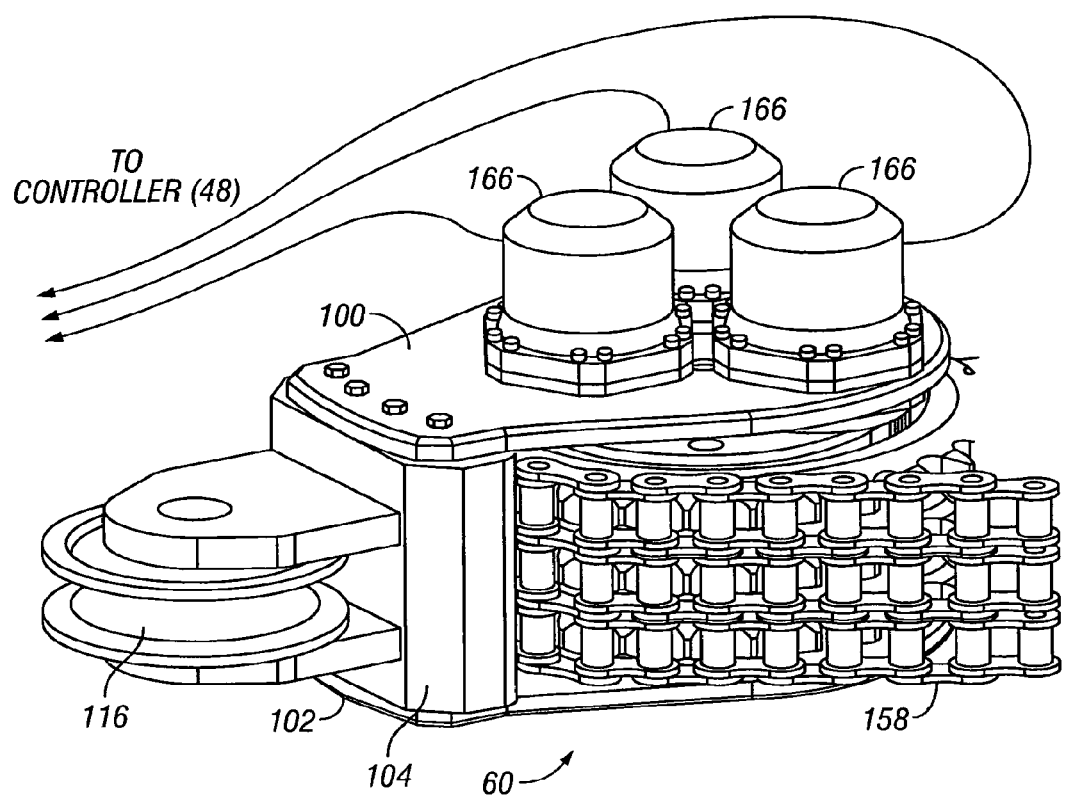
FIG. 9 shows an oblique view of the node position controller.

A more detailed view of the node position controller 60 showing one possible position for the motors 166 is shown in FIG. 9. The motors 166 may be affixed to an upper housing 100. The planet carrier (88 in FIG. 8C) may also be affixed to the upper housing 100. The planetary gear unit and sprocket 90 may be disposed between the upper housing 100 and a lower housing 102 disposed on opposed sides of a controller frame 104. One side of the controller frame 104 may include an attachment loop 116 or similar coupling to engage and retain the end of the tow rope (16 in FIG. 3).

Figure 10:
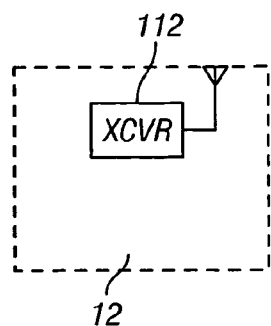
FIG. 10 shows example circuitry for a direction controller unit.
Figure 10:
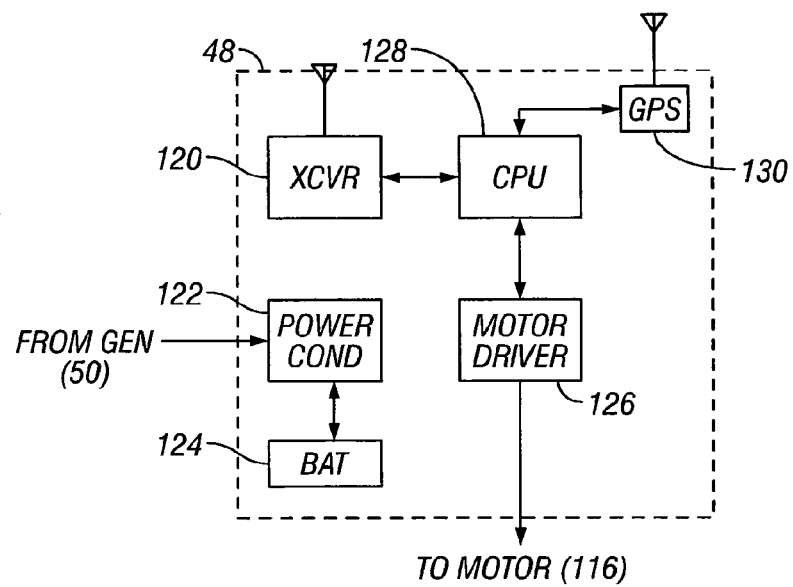

One example of a directional controller unit 48 and its functional interaction with the recording system (12 in FIG. 1) will be explained with reference to FIG. 10. The controller unit 48 may include a radio frequency transceiver 120 configured to communicate signals between the controller unit 48 and a compatible transceiver 112 on or in the recording system 12. The transceiver if functionally coupled to a central processor ("CPU") 128 which may be any type of microcontroller or programmable logic controller ("PLC") known in the art. The CPU 128 is functionally coupled to a motor driver 126, which converts control signals from the CPU 128 into electric current to operate the motors (166 in FIG. 9). The CPU 128 may also be in functional communication with a global positioning system (GPS) receiver 130. Electrical power to operate some or all of the foregoing may be supplied by the generator (50 in FIG. 2), the output of which is coupled to a power conditioner 122. The unit 48 may include a battery 124 or other energy storage device to keep the control unit components energized during times when the generator (50 in FIG. 2) is inoperative. In the present embodiment, command signals to operate the node position control unit (54D in FIG. 3) may be generated by the recording system in response to, for example, measurements of position made by the GPS receiver 130 indicative of the paravane (14 in FIG. 1) not being in a selected position relative to the seismic vessel (10 in FIG. 1). Using such operating techniques, a selected geometry of the acquisition system may be maintained. Maintaining or controlling other parameters of the acquisition system, for example, maintaining selected tension on the spreader cables or on the tow ropes, can also be performed using a steerable paravane according to the various aspects of the invention.

A marine acquisition system using steerable paravanes according to the various aspects of the invention may be better able to maintain acquisition system geometry notwithstanding making turns in the water, currents in the water and other conditions that would affect the geometry of the acquisition system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling lateral force exerted by a paravane system towed by a vessel, comprising:
   moving the vessel through a body of water;
   coupling motion of the vessel to an effective tow point associated with a first paravane; and
   changing the effective tow point of the first paravane to provide a selected angle of attack of the first paravane, wherein:
   the coupling motion of the vessel to an effective tow point associated with the first paravane comprises coupling a first tow rope to a coupling point on a first bridle, the first bridle including at least one forward cable coupled at a first end proximate a forward end of the first paravane and movably coupled at a second end to the coupling point on the first bridle, the first bridle including at least one aft cable coupled at a first end proximate an aft end of the first paravane and movably coupled at a second end to the coupling point on the first bridle; and
   the changing the effective tow point of the first paravane comprises selectively changing a distance between the coupling point on the first bridle and the second end of each forward cable and each aft cable, thereby changing an angle of attack of the first paravane in the water.

2. The method of claim 1 wherein the selectively changing comprises rotating a sprocket having a chain in operative contact therewith, wherein a forward end of the chain is coupled the second end of each forward cable, and the aft end of the chain is coupled to the second end of each aft cable.

3. The method of claim 2 wherein the rotating comprises operating a motor rotationally coupled to the sprocket.

4. The method of claim 3 further comprising generating electric power by converting motion of the paravane through the water into rotational energy to drive an electric generator.

5. The method of claim 3 further comprising operating the motor so as to maintain a selected geometric relationship between the vessel and the paravane.

6. The method of claim 3 wherein the motor is rotationally coupled to the sprocket using a planetary reduction gear unit.

7. The method of claim 1 further comprising:
   coupling motion of the vessel to an effective tow point associated with a second paravane laterally displaced from the first paravane; and
   changing the effective tow point of the second paravane to provide a selected angle of attack of the second paravane.

8. The method of claim 7 wherein:
   the coupling motion of the vessel to an effective tow point associated with the second paravane comprises coupling a second tow rope to a coupling point on a second bridle, the second bridle including at least one forward cable coupled at a first end proximate a forward end of the second paravane and movably coupled at a second end to the coupling point on the second bridle, the second bridle including at least one aft cable coupled at a first end proximate an aft end of the second paravane and movably coupled at a second end to the coupling point on the second bridle; and
   the changing the effective tow point of the second paravane comprises selectively changing a distance between the coupling point on the second bridle and the second end of each forward cable and each aft cable, thereby changing an angle of attack of the second paravane in the water.

9. The method of claim 7 further comprising controlling an angle of attack of each of the first and second paravanes to maintain a selected geometric relationship between the first and second paravanes and the vessel.

10. The method of claim 9 wherein the selected geometric relationship comprises maintaining a lateral position of each paravane with respect to the vessel.

11. The method of claim 9 wherein the selected geometric relationship comprises maintaining a selected tension on a spreader cable disposed between the first and the second paravane.

* * * * *